Patented Aug. 29, 1950

2,520,470

UNITED STATES PATENT OFFICE 2,520,470

PROCESS OF TREATING FATTY ACIDS

Latimer D. Myers, Cincinnati, Ohio, assignor to Emery Industries, Inc., Cincinnati, Ohio, a corporation of Ohio No Drawing. Application March 28, 1945,
Serial No. 585,387

7 Claims. (Cl. 260—419)

This invention relates to a process of purifying fatty acids. It is directed particularly to a method for removing unsaponifiable materials from commercial fatty acids in order that they will be less contaminated with foreign substances and therefore more valuable. This application is a continuation in part of my copending application, Serial No. 420,106, filed November 22, 1941, now abandoned.

The fats and greases from which commercial fatty acids are obtained or produced contain amounts of unsaponifiable material and the nature of this contamination varies sometimes in accordance with the sources from which the fatty acids are produced and sometimes from batch to batch of fatty acids derived from a given source. For example, the variation in the unsaponifiable content of fatty acids is illustrated in the table which follows:

| | Per cent |
|---|---|
| Prime tallow | 1 |
| Diamond S tallow | 1.25 |
| Yellow grease stearine | 1.25 |
| Brown or horse grease | 1.6 |
| Bone grease | 1.5 |
| Extracted grease | 2.5 |
| Garbage grease | 4–9 |

Among the compounds which may be present are the sterols, such as cholesterol and phytosterol, higher alcohols and hydrocarbons either naturally occurring or present as contaminants. Greases produced in extraction processes often contain high boiling constituents derived from the solvent with which the greases were extracted from the animal tissue.

In the manufacture of stearic and oleic acids from greases of the type illustrated in the example the unsaponifiable content is found mainly in the oleic acid fraction. Its presence is undesirable inasmuch as it is an inert substance which is valueless for use in soap making, one of the chief purposes for which oleic acid is employed, but also because it tends to cause cloudy soap solutions when present in too great quantities.

Purchasers of commercial oleic acid specify limits which the unsaponifiable content may not exceed and the price of the commercial acids fluctuates in accordance with the percentage of contamination; oleic acid with a low unsaponifiable content often commands a premium in price. These same marketing rules are observed with respect to the natural fats from which the fatty acids are derived and it is therefore distinctly desirable to be able to produce an oleic acid which contains as little in amount as unsaponifiable material as possible from a fat which may contain a relatively large amount.

The principal objective therefore has been to provide a method by which the unsaponifiable content of fatty acids may be reduced in the process of fatty acid manufacture.

Fatty acids are generally manufactured from dark colored raw materials. Light colored fatty acids are produced by distilling the fatty acids after they are split off from the fatty glycerides. The distillation is commonly carried out in two stages, the first stage being so conducted that a residue is obtained containing approximately 15% of free fatty acid together with neutral fat and a considerable proportion of the unsaponifiable material originally present in the stock. This residue may either be split further to decompose additional quantities of neutral fat and then distilled, or distilled directly in what are known as tar stills. The second stage of the distillation is carried out in such a manner as to distill as much of the fatty acid as possible and to leave in the still tar or fatty acid pitch of an acceptable consistency and melting point.

As the major portion of the unsaponifiable appears to have a slightly higher boiling range than the fatty acids which are present, a considerable portion of the unsaponifiable products remains in the pitch. However, the last portion of the distillate may contain from 20% to as high as 40% of unsaponifiable material, the remainder being fatty acids.

This invention resides in the discovery that the fatty acids and unsaponifiable materials possess differential solubilities in certain solvents which makes it possible to obtain two fractions, one consisting principally of unsaponifiable material while the other is relatively low in unsaponifiable content. More specifically, the invention resides in the method which comprises admixing the fatty acids containing unsaponifiable material with a solvent in which the fatty acids are more soluble than the unsaponifiable material and in such amount that the unsaponifiable material becomes immiscible with the solvent containing the fatty acids, then separating the two components from one another and finally removing the solvent from the fatty acid. Any solvent taken from the solution upon separation of the unsaponifiable materials therefrom may also be recovered by distillation.

Solvents which are suitable for the operation of this process are those which may be characterized as very good solvents for fatty acids, but rather poor solvents for hydrocarbons. Typical solvents are low molecular weight alcohols, acids or ketones containing not more than three carbon atoms. Methyl alcohol has been found to be a very satisfactory solvent; acetic acid is also suitable; acetone can be used but is not a satisfactory as methyl alcohol due to its greater solubility for hydrocarbon oils.

Briefly, then, in the process of the present invention the fatty acid containing unsaponifiable material is admixed with the solvent of the type described and the mixture is then permitted to settle. Two layers are formed, an upper layer containing fatty acids free or substantially free of unsaponifiable contaminants and a lower layer consisting of some of the solvent and a large percentage if not all of the unsaponifiable material originally contained in admixture with the fatty acids. These two layers are separated and the solvent content of the lower layer subsequently may be removed as by evaporation. The purity of fatty acids obtained in this manner, so far as unsaponifiable contaminants are concerned, exceeds the purity of fatty acids obtained even by the most careful distillation procedure and the process, therefore, is one enabling fatty acids of greater value to be obtained at low cost.

Considering methanol as a typical and entirely suitable solvent, it has been found that certain conditions should be observed in order to obtain the maximum degree of separation consistent with economical operation.

The concentration of the fatty acids in the alcohol solution is of great importance. The solubility of the unsaponifiable material in the solution of fatty acids in methanol is proportional to the concentration of the fatty acids, that is, a concentrated solution of fatty acids in methanol has solvent characteristics approaching those of fatty acids in which unsaponifiable material is soluble in all proportions at ordinary temperatures. For this reason a low concentration of fatty acid in alcohol is desirable. Usually the concentration of fatty acid should not exceed approximately 10% by weight of the solvent.

The temperature at which the separation is effected also affects the results obtained. The temperature must be kept high enough to prevent crystallization from solution of the solid fatty acids, i. e., about 30 degrees C. With an increase in temperature the amount of the high unsaponifiable content layer decreases but its actual unsaponifiable content increases, that is, at a higher temperature less fatty acids are carried down by the unsaponifiable layer. However, at the same time the unsaponifiable content of the alcohol fatty acid solution increases to the same content. In other words, increased temperatures increase the solubility of the fatty acids in the solvent resulting in a lower loss of fatty acids, but also increases the solubility of unsaponifiable in the alcohol layer. In general, temperatures of from 30 to 45 degrees C. give the most satisfactory results from the standpoint of yield and quality.

Decreasing the strength of the methanol decreases the content of the unsaponifiable material in the methanol layer but results in excessively high losses of fatty acids in the unsaponifiable layer. For this reason 85 to 90% methanol is recommended. The effect of variation in solvent characteristics with alcoholic concentration permits the operation of a recycling two stage process which enables higher yields of lower unsaponifiable material to be obtained than can be economically attained by a single stage process. Thus, the first extraction may be carried out with 90% methanol which will yield a fairly low unsaponifiable product; addition of water to the alcoholic solution thus obtained to reduce the alcoholic strength to 80% will effect a further separation of unsaponifiable but the quantity of unsaponifiable layer will not be great enough to dissolve any considerable quantity of fatty acids.

The separation is conveniently carried out as a continuous process by mixing the distillate containing unsaponifiable material and the solvent suitable by a centrifugal pump which also serves to move the resulting solution to a settling tank. Separation into two layers occurs very quickly and a tank of sufficient size to provide 10 minutes settling is ample. The upper alcoholic solution preferably is drawn off continuously and fed to an evaporator, the lower layer containing unsaponifiable material may be drawn off either by hand or by automatic float control continuously or intermittently and thereafter stored and evaporated periodically to recover the solvent it contains.

The following examples illustrate the method of carrying out the proposed process.

*Example 1*

5 parts of tar still distillate containing 17.5% of unsaponifiable material is mixed with 95 parts of 95% by weight methyl alcohol and allowed to stand at 27 degrees C. The lower unsaponifiable layer amounts to 16.1% of the fatty acid taken and contains 22% of fatty acid, the remainder being unsaponifiable with a few percent of neutral fat. The alcohol solution is evaporated yielding 83.9% of fatty acid containing 7.4% unsaponifiable or a reduction of 10.1% in unsaponifiable content with a loss of 3.5% in fatty acids.

*Example 2*

5 parts of the final portion of tar still distillate containing 28.5% of unsaponifiable material are treated as described above. The unsaponifiable layer amounts to 25.5%, containing 13.3% free fatty acids. The alcoholic solution yields 74.5% of product containing 8.06% unsaponifiable or a reduction of 20.44% in unsaponifiable with a loss of 3.51% of fatty acids.

*Example 3*

Using the same unsaponifiable content material as in Example 2, but treating 15 parts with 85 parts of 90% alcohol, the unsaponifiable layer amounts to 43.2% containing 38.5% free fatty acid, and the fatty acids recovered from the alcoholic solution amounted to 56.8% containing 7.88% unsaponifiable. The unsaponifiable reduction amounts to 20.6% but the fatty acid loss amounts to 16.6%. This method which is economical from the standpoint of quantity of alcohol which must be distilled can be recommended only when fatty acids of low value are processed.

*Example 4*

5 parts of tar still distillate containing 20% of unsaponifiable material were treated with 95 parts of 85% by weight methanol at 50 degrees C. The lower layer amounted to 24.7% containing 26.5% free fatty acid. The remaining upper layer contained 5.6% of unsaponifiable or about 2-2.5% less than would be obtained by a corresponding treatment with 90% methanol.

Example 5

Tar still distillate containing 20% unsaponifiable was treated in 10.8% concentration with 90% by weight methanol. 14% of lower layer containing 24% free fatty acid was obtained, a sample of the upper layer showed 10.5% unsaponifiable content. Water was then added to the upper layer until the alcohol strength was reduced to 82%. A second lower layer amounting to 34.8% containing 65% of free fatty acid separated. The solution remaining yielded fatty acids containing 4.5% unsaponifiable. The second residue, being high in free fatty acid content, may be retreated with 90% methanol by blending with the feed. In this case a corresponding increase in amount and unsaponifiable content of the first residue results. The alcohol from the second operation is rectified during distillation to increase its concentration for re-use in the first operation.

From these examples it will be apparent that the process disclosed does not fractionate the fatty acids and the unsaponifiable material sharply and that when the unsaponifiable content of the solution is below 7% unsaponifiable to 93% fatty acids, a substantial amount of fatty acids does not go into solution but remains with the unsaponifiable material. The process therefore is not suitable for commercial use under a great variety of conditions in a fatty acid plant.

The invention is primarily intended and adapted for use when fatty acids having an unsaponifiable content above 10% are to be purified. Such high unsaponifiable contents do not occur in natural fats or commonly in garbage grease. Rather such high unsaponifiable contents result from the accumulation of smaller amounts of unsaponifiable material in the starting products, for instance, the still residues previously described. In the case of still residues, the high unsaponifiable content is the result of repeated distillations by which free fatty acid is removed from the stock.

The process is not particularly suitable for treating still residues and obtaining fatty acids which by themselves are of commercial value because if the process is operated to remove a substantial proportion of the fatty acids in the still residues then, as explained, its content of unsaponifiable is too high for most commercial purposes. Fatty acids obtained must usually be mixed with fatty acids of greater purity to produce a product of sufficiently low unsaponifiable content.

On this account I prefer to use the process of this invention in combination with the process of separating fatty acids by solvent separation. This process is described and claimed in Patent No. 2,293,676, issued August 18, 1942, Method of Separating Fatty Acids. According to the disclosure of this patent the mixed fatty acids are dissolved in a solvent, such as strong methyl alcohol, the strength of the solution of the fatty acids in the alcohol being 15–30% by weight; then the temperature is lowered to precipitate the solid acid fractions after which they are separated from the solution by filtration. When the processes are used conjointly the solvent is first used to extract free fatty acids from the still stock, after which additional fatty acids are added to provide a total concentration of fatty acids in alcohol of about 30%. The solution is then chilled to precipitate the solid fatty acids which are removed by filtration. In this way, the unsaponifiable content of the final product is kept within commercial limits, yet wastage of the fatty acids in the still residues is avoided.

Having described my invention, I claim:

1. The method of purifying fatty acid stocks, the unsaponifiable content of which is greater than 10%, said method comprising treating said material with a solvent of the class consisting of lower molecular weight alcohols, acids and ketones, containing not more than three carbon atoms, the concentration of fatty acids in the solvent solution not exceeding substantially 10%, then adding fatty acids of lower unsaponifiable content to said solution to increase the concentration of fatty acids in the solution to substantially 30%, then chilling said solution to precipitate the solid fatty acids in it and removing them from said solution by filtration.

2. The method of treating tar still distillate, which comprises admixing the tar still distillate with about twenty parts by weight of approximately 90% methyl alcohol, settling the unsaponifiable material from the solution while the solution is held at a temperature of about 30 to 45° C., separating the solvent solution of tar still distillate from the settled unsaponifiable material and separating the methyl alcohol from the fatty acids.

3. A process of preparing purified fatty acids which comprises admixing fatty acid tar still distillate with methyl alcohol to obtain a solution not exceeding substantially 10% concentration and separating the unsaponifiable material from the solution while the solution is held at a temperature of about 30 to 45° C. and thereby extracting free fatty acids from the still stock, and subsequently adding fatty acid stock having a lower unsaponifiable content than the still stock to the extract to increase the concentration of fatty acid therein to substantially 30% and subsequently chilling the solution to precipitate solid fatty acids therein, and removing said precipitated solid fatty acid.

4. A method of recovering fatty acid values from tar still distillate, which method comprises admixing one part of distillate to about twenty parts by weight of approximately 90% methyl alcohol and thereby extracting free fatty acids from the still stock and subsequently adding to the extract fatty acids of a lower unsaponifiable content than the tar still distillate to increase the fatty acid concentration thereof to approximately 30%, then chilling the extract of the increased fatty acid concentration to precipitate fatty acids therein and removing said fatty acids from said solution by filtration.

5. A method of processing fatty acids comprising dissolving 5 to 10 parts fatty acids of high unsaponifiable content in from 90 to 95 parts of from 85 to 95% methanol at a temperature of from 30 to 45° C., allowing the mixture to settle to effect a separation of unsaponifiable material, withdrawing the alcohol solution of fatty acids, adding additional quantities of fatty acids to said solution and proceeding with the separation of the solid and liquid fatty acids.

6. The method of obtaining from tar still distillate which has an unsaponifiable content of above 10%, a fatty acid product having a lesser unsaponifiable content, said method comprising treating the tar still distillate with a solvent of the class consisting of lower molecular weight alcohols, acids and ketones containing not more than three carbon atoms to provide a solution in which the concentration of the fatty acids is less than 10% by weight, separating the solution from the residue which does not enter into the solution and separating the solvent from the fatty acids which are dissolved in it.

7. The method of obtaining commercial solid and liquid fatty acid fractions utilizing as an ingredient tar still distillate having an unsaponifiable content of greater than 10%, said method comprising treating the tar still distillate with a solvent of the class consisting of lower molecular weight alcohols, acids and ketones containing not more than three carbon atoms to provide a solution of fatty acid in solvent in which the concentration of fatty acids is less than 10% by weight, separating the solution from the residue which does not enter into solution, adding fatty acids to the solution to increase the fatty acid concentration of the solution to substantially 30% and separating the solid and liquid fatty acids in solution from each other.

LATIMER D. MYERS.

REFERENCES CITED

The following references are of record in the file of this patent:

UNITED STATES PATENTS

| Number | Name | Date |
|---|---|---|
| 2,113,960 | Grote | Apr. 12, 1938 |
| 2,298,501 | Meyers et al. | Oct. 13, 1942 |
| 2,381,420 | Balch | Aug. 7, 1945 |

OTHER REFERENCES

Ubbelohde: "Handbuch der Chemie und Technologie der Ole und Fette," vol. 3, page 209, Leipzig, 1910.